8325X
D. Livermore,
Hydraulic Engine.
Patented July 24, 1834.
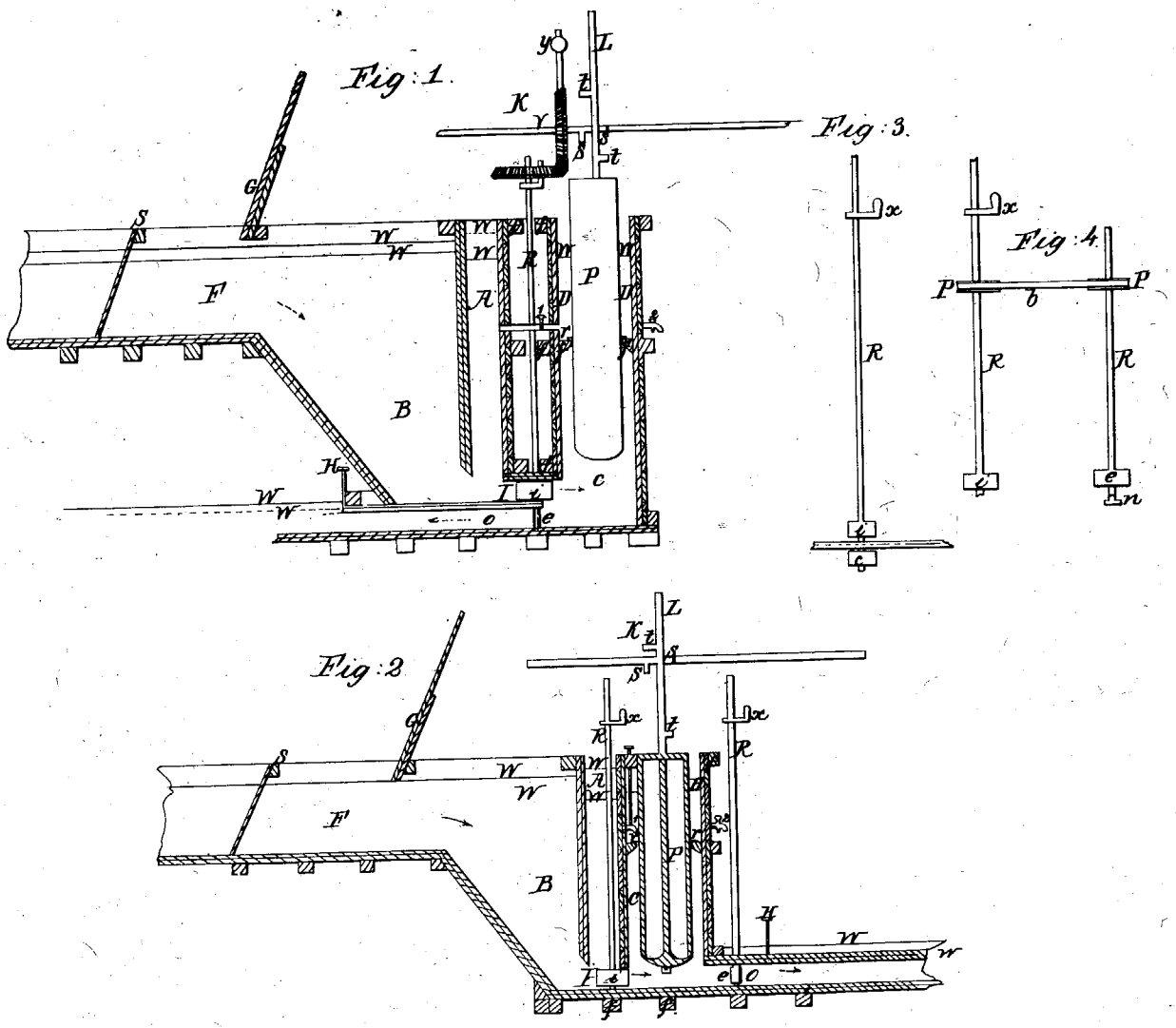

Daniel Livermore, near Blairsville, Penna

8325X Letters Patent 8325X

The schedule referred to in these Letters Patent and making part of the same containing a description in the words of the said Daniel Livermore himself, of his improvement in the Hydraulic machine which he terms - the "regulated pressure Engine".

---

To all whom it may concern - Be it known that I Daniel Livermore, residing near Blairsville, in the County of Indiana, and State of Pennsylvania, have invented a new and useful hydraulic machine, which I term the regulated pressure engine; and the following is a full and exact description of the construction and operation of this engine or machine, under different modes of arrangement and combination of its component parts, as invented by me, and suited to various situations and different circumstances attending its application as hereafter described and more fully illustrated by the annexed drawings which form a part of the specification —

In the construction of this engine, or in connection therewith, a receptacle is required to receive and transmit the water necessary for its propulsion - This receptacle is designated as the forebay or flume (F) and is made in like manner as these structures are usually formed for the conveyance of water to propell water wheels.

In its formation, the most essential requisites to be secured are - that its capacity and form be such as to afford sufficient water-way free from obstruction by unnecessary angles or otherwise, and that it be provided with a stop gate (G). to stop off the water when required for repairs - or other purposes. It should likewise be provided with a rack or screen (S). which may be placed within the forebay, or more conveniently in a space enlarged for the purpose before its entrance: in either case it should be so constructed as to allow the water to pass freely, and prevent the entrance of such extraneous floating substances as would be liable to injure or impede the action of the engine —

I do not claim any thing new in the construction of the forebay, or the rack, and stop-gate connected therewith: the mode of construction is essentially the same as adopted when used for conveying water to water-wheels: and I do not consider it necessary to give a minute description of the forebay, or its appurtenances before alluded to, any further than is necessary to show the nature of its application, as an appendage to this engine. Independently of this appendage, as before described, the engine consists of

8325X four principal divisions or compartments, which may be designated as the penstock or conductor (B), the cylinder (C) the reacting compartment (A) and the regulating compartment (D). Sectional views of the regulated-pressure Engine are represented in figs. 1 and 2. showing different modes of constructing and arranging the component parts: but still preserving the same mode of action, which is secured under various forms of arrangement as more fully illustrated hereafter. The longitudinal direction of the forebay (F), as shown in fig. 1. is at right angles to the course on which it would be most convenient to construct this appendage when the component parts of the engine are arranged in the manner there illustrated. -

The forebay is terminated by connection with the penstock or conductor (B), which is so constructed as to transmit the requisite quantity of water for the propulsion of the engine, and affords a free passage from the forebay to the cylinder (C), where the water is admitted, when the inlet (I), is open for the purpose. The reacting compartment (A) is formed over the inlet (I) and as near as convenient to the induction gate or valve by which it is controled. This compartment is conveniently formed by means of a partition of plank, boards, or other suitable materials making two divisions of the penstock, so that the division forming the reacting compartment shall have at least half of the size of the other division, constituting the conductor: or in other words, it is calculated to contain about half as much water; which is allowed to rise to a greater height than its ordinary level in the forebay.

This superior elevation of the water is acquired soon after the induction gate or valve (i) is suddenly closed, and results from the continuous motion previously acquired by the water within the forebay and conductor, and upon reopening said gate or valve, the water is allowed to enter the cylinder with the advantage due to the superior elevation thus acquired. In other respects the reacting compartment is calculated to produce like effects as an air vessel in obviating any concussion which might otherwise be produced by suddenly arresting the water in its passage to the cylinder. --

The cylinder is that part of the engine or compartment within which the water acts, to produce the upward and downward strokes or vibrations of the engine. The vertical portion of the cylind may have a cylindrical form as its name imports, but it is not restricted to this shape, and any other form may be adopted, which gives room for the plunger (P) to act with freedom, and allows free ingress and egress for the water acting upon the plunger in either direction; as the inlet or outlet is open for its escape from, or entrance to the engine. It is advisable in all cases to give a smooth surface to the internal parts of the engine in places which come in contact with the water, and through which it passes; and where a

[illegible] of direction is given to the water it is preferable to effect it by means of a curve instead
of an abrupt angular turn in the passage; but a rectangular form is generally most con-
veniently adopted in the construction of the principal compartments: and on this account when
wood is the principal material used in their construction, I would recommend this form:
and that their internal angles be slightly curved by plank, or timber properly fitted for the
purpose, and calculated to increase the strength, and combine the different parts of the en-
gine. The cylinder is separated from the regulating compartment, by a horizontal parti-
tion through which the plunger (P) passes and occupies a central opening in said partition
which may be considered as the top of the cylinder, or the bottom of the regulating com-
partment. This partition is secured firmly in its place, and attached to the sides of the
cylinder and regulating compartment in such manner as to form water-tight joints
except around the central opening through which the plunger passes. a thick circular
plate (c) of brass or lead forms a ring around this opening, and being properly fitted,
and firmly secured in its position, is calculated to supersede the necessity of packing.
Lead is, in most cases preferable to brass as a substitute for packing, and should be
so formed, and placed, that when from wear or other causes, the opening becomes too
large, a few blows from a proper instrument will serve to extend the metal, and make
it fit with sufficient closeness. It is not advisable to have this ring fit so closely
around the plunger as entirely to prevent the passage of water: for by so doing, a loss of
power will be sustained from friction, greater than will result from the passage of a
small quantity of water through the opening, and around the plunger. By suffering the
plunger to play loosely any air is allowed to escape, which collects within the cylinder
and might impair the action of the engine, if not allowed to escape therefrom in this
manner, or by some other outlet formed to answer the purpose.
The induction and eduction valves, or gates, are made of cast or maleable iron and
firmly secured to an iron or steel shaft, or rod (R.). This rod serves the purpose of
an axis or hinge for turning these gates or valves and should be placed in regard to
each gate, in a central position, so that the pressure of the water may not materially
retard the action of the gates or interfere with their motion otherwise than by friction
incident thereto. In most cases I consider it best to form these gates or valves of
maleable iron, flattened into a plate of rectangular or circular form in such man-
ner that the central parts in a line with their shaft or rod, shall in thickness nearly
equal the diameter of the shaft, and the edges which are presented in the direction of

8325X the current when the gates are open, to be made as thin as consistent with the strength required, and increasing regularly in thickness to near the centre line; when the angle formed in the direction of the shaft or rod is somewhat flattened or curved.

The rod or shaft may be made of iron or steel, and welded to the gate, or gates, in the position required. a steel rod I consider preferable to an iron one, but the latter is the cheapest, and will generally answer the purpose.

The induction and eduction valves or gates before described are formed in like manner and fitted to turn in their seats or casings upon the same principle of the paddle gates in common use for canal locks; and may therefore be termed the paddles or working gates of the engine. These paddles or gates are made to turn by means of the shaft or shafts to which they are attached, and so adapted and fitted by their construction, that by turning the shaft or shafts through an arc of 90° or one fourth round, and continuing the operation alternately in opposite directions, closes one gate and opens the other, and thus allows the reciprocating action of the water, which is required to produce an alternating motion in the plunger or in other words, to cause the opposite strokes of the engine. The relative position of these paddles or gates is varied to suit the different situations in which the engine is placed, in such manner as to admit the water to the cylinder, and allow of its discharge in the most convenient direction; and different modes of constructing and arranging the paddles, and fitting their seats or casings to correspond, are adopted as the circumstances, under which they are applied require. –

In some cases it may be convenient to discharge the water from the cylinder in a direction directly opposite to that by which it is introduced; and under these circumstances, the inlet would be directly over the outlet, and the paddle seats, or casings, should both occupy the same plane, one above the other: then the paddles are made to correspond by being placed at right angles to each other, and attached to one and the same shaft. and occupy different planes, so that by turning the shaft, both paddles move in their seats and one is opened, while the other is closed, as shown in fig. 1. –

If the inlet be above, and at right angles to the outlet, the paddles may be attached to one and the same shaft, or rod, and occupy the same plane as shown in figure 3. In this case the seats are made to correspond with the inlet and outlet, and consequently are at right angles to each other: therefore the paddles being made as before described, and the flanches against which they close in their seats having the position required to fit the gates, and allow them, as in other cases to move freely when opened or or closed in contrary directions, will have the action required, and by turning the shaft one will close, while the other is opened to admit or discharge the water which propels the engine. The paddles are sometimes attached to separate shafts or rods, as shown in figures 2 and 4. and these modes of arrangement I consider more generally applicable, and calculated to suit a greater variety of situations than either of the before mentioned modes of combination, and the latter method affords greater facility for placing the gates in positions easy of access for repairs or other purposes. When the paddles are each provided with a shaft or rod, they may be connected and made to move simultaneously by means of a chain, cord or band (b) passing round and fastened to the pulleys (p.p.) which are firmly attached to each shaft so that one shaft which is provided with a crank (4), being acted upon by the hand gear hereafter described, both shafts or rods move as required so that one of the paddles is closed while the other is opened. When the paddles are each provided with a shaft and furnished with a crank for each shaft as shown in fig. 2. the connection is formed and they are made to move simultaneously in the manner required, by adding two wheels to the hand gear, like those hereafter described for operating the single shaft: the two shafts or rods should in all cases, be so connected as to open the paddles or valves attached thereto, in such manner as to reverse the motion of the engine, whether it be effected by means of a cord, chain, or band, or by the two extra wheels added to the hand gear. The seats or casings for these gates are made and fitted in similar manner to that adopted for paddle gates, as usually constructed for canal locks; It is however advisable in most cases to bestow more attention on the workmanship, and I would recommend that journals of brass, or other suitable materials, be fitted to these seats, or connected therewith in such manner as to secure the paddle shaft in a proper position and enable it to move in the manner required, and with as little friction as circumstances will admit. It is advisable to leave a vacancy or space under the seats or casings, and in this space, to place a pivot of cast iron or other suitable material for the paddle shaft to turn on: the foot of [the] shaft to be formed concave, to fit the point of the pivot which is convex, the shaft to be secured in its place over the pivot (n) by journals secured to the casings or otherwise so as to retain their position unmoved by the action of the paddles. an opening should be left to allow the current of the water to carry away any sand which might otherwise collect at the foot of the shaft, and fill the space around the pivot. The flanches, or that part of the seats or casings against which the paddles close, may be formed of cast iron wood or other materials, and

8325X secured firmly in their proper position: but I consider it advisable to interpose a strip of spongy leather or other yielding substance between the flanch and that part of the paddles which comes in contact therewith. The plunger (P.) may be made of wood, and in some cases, solid, as represented in fig. 1. but it is better for most purposes to form it hollow, as shown in fig. 2. and generally it should be made of cast iron or other metalic substance in preference to wood. I consider the cylindrical form better adapted for a plunger than any other; but for temporary purposes, or where economy in the construction is paramount to other considerations, the plunger may be formed of a solid piece of firm, hard timber, squared a suitable length, and having a smooth surface, the shape of the opening through which it passes into the cylinder being as in other cases, made to fit the plunger.

The length of the plunger, should in all cases, considerably exceed the length intended for the stroke of the engine, so that the upper end may not at any time be under water; the diameter of the plunger, or the area of its cross section should be calculated to correspond with the quantity and head of water, by which the engine is to be propeled, and other parts of the engine adjusted accordingly in such manner that its force may be adequate, and advantageously disposed of, for the particular purpose to which the engine is to be applied. The head of water being given, its weight or pressure, when acting upon a plunger of given dimensions, is readily determined by well known mathematical rules, so that the force of water thus applied, may be calculated with sufficient accuracy to adapt the power of the engine to the propulsion of a pump, or any other purpose for which the requisite force is known. —

In the construction of hollow plungers, only such quantity of the before mentioned materials are required, as will give the proper dimensions and insure a due degree of strength. By varying the weight of the plunger, the energy of the force exerted in either stroke or vibration of the engine is increased or diminished so as to adapt its direction to the resistance to be overcome; and sand or other heavy and cheap materials, are put within the hollow plungers in such quantity as may be required, to adapt the force of the engine to the particular purposes to which it is to be applied. In order to more fully control and regulate the force of the engine, and secure some other advantages, the regulating compartment (D) is added to, and placed above the cylinder.

Said compartment is open at the top, and its bottom formed as before stated, of the partition which constitutes the top of the cylinder. The sides are made to retain water, and of such dimensions and forms as to afford room for the free action of the plunger.

8325X

Water is introduced within the regulating compartment through a stop cock (1 which gives a communication to the column which propels the engine, or with other source from whence the water can be introduced; and whenever an excess of water accumulates within said compartment it is withdrawn by means of one or more stop cocks (2) so constructed and placed as to answer the purpose of diminishing the quantity of water in said compartment when required. The quantity of water within the regulating compartment being by the means before stated increased or diminished, at pleasure, serves, by its bouyant action in the effect produced, to increase or diminish the acting weight of the plunger, as may be required to adjust and apply the force of the engine, in a manner calculated to meet the resistance to which it is opposed.

To render water power most effective in its application I consider that its force should be nearly expended at the close of either stroke of the engine; and this result may be obtained in some cases by properly adjusting the weight of the plunger, and varying the quantity of water in the regulating compartment. In other cases this adjustment is applied so as to secure the required mode of action for the upward stroke of the engine, and to ensure a like result in the downward stroke, a spring pole is so connected with the plunger as to absorb a part of the force in this direction, which by the reaction of the spring is exerted in the opposite stroke of the engine -

The plunger rod (L) is made of iron, or other suitable materials, and forms a connection with the machinery to be propeled by the engine in the same manner as the piston rod of steam engines: provision as usual being made to secure a rectilineal motion for the plunger and its rod. On the plunger rod are two tappets (t.t) or projecting pins which it is advisable in most cases, to have movable in such manner that by varying the distance of one above the other, the length of the engine stroke may be increased or diminished when required. It is better to have these pins or tappets attached to a pitman in some cases; the pitman being connected with the engine in such manner as to have the motion required, and in a suitable direction to operate upon the hand gear. In all cases these pins or tappets are to have the requisite motion, and be properly placed to come in contact with the spanners (S.S) and serve thus to set the hand gear (X) in motion, and alternately reverse the stroke of the engine, by closing one of the paddles and opening the other -

The hand gear (X) fig 1 consists of the spanners (S.S) before mentioned, which are attached to a horizontal shaft that is secured in its place, but turns on its axis

8325X with freedom. a wheel (v) attached to this shaft; serving to drive a wheel (h) which operates upon the paddle-shaft or rod, and thus opens or closes the gates.

The horizontal wheel (N) turns without moving the paddle, shaft or rod, until brought in contact with its crank (4) which passes through an open space in the wheel: thus the wheel is at liberty to move a short distance without affecting the paddle shaft until by contact with its crank the shaft is set in motion: and the momentum previously acquired by said wheels and a tumbler (y) connected therewith tends to ensure a continuance of this motion till one of the paddles is cosed and the other open.

The outlet (6) is provided with a stop-gate (16) which serves when entirely closed to prevent the escape of water from the engine, and thus stops its action, or, if only partially closed it diminishes the speed of the engine. To prevent the admission of air within the cylinder it is advisable to have the outlet at all times immersed in water: and this circumstance or desideratum should be taken into consideration, in the construction of the engine, and provision made to prevent the liability of obstruction from this source -

I consider wood to be generally the most suitable material for the construction of the principal parts of this engine: at least in most cases it is preferable, on the ground of economy in its construction, and affords sufficient strength for any ordinary head of water. In the sides and partitions which form the principal compartments, it is advisable to make use of two courses of planking or boards, instead of one, and to have the planking or boards placed longitudinally in the direction of the current for the internal parts of the engine, and Transversly for the external parts: the whole to be supported and secured by a frame work of timber, to which the boards or planking is made fast by treenails bolts, spikes, or nails in such number and position as circumstances may require, so as to give the strength required, and form water tight joints; and ensure sufficient strength for resisting the internal pressure on different parts of the engine.

The requisite strength will vary with the weight or pressure of water to be sustained and the foundation and frame work should be calculated accordingly, and in other respects adapted to the particular situation which the engine is to occupy, and the purposes to which the force is applied - I do not claim the mere principle of applying water to act by pressure as new: neither do I claim all the individual parts of this engine as in themselves new: only the reacting compartment, and regulating compartment, as individual parts, are claimed as new, but the various component parts of the engine, when constructed as before described, and combined under any of the modes of arrangement spe-

8325X specified, form by such combination and arrangement a new engine or machine, which I
term the regulated-pressure engine, and claim as my invention.
To prevent mistake the annexed drawings are more fully explained as follows—
Figs. 1 & 2. represent sectional views of the regulated pressure engine, with the component parts
different arranged to illustrate different modes of construction and combination — Figs. 3 & 4
represent other arrangements for the paddle-gates or valves. Like parts in the different figures.
are marked by the same letters, and numerally as follows — F. forebay — S rack or screen — G.
stop gate — B. penstock — A. reacting compartment — C. cylinder — I. inlet and O the outlet for
the entrance and discharge of water — D. regulating compartment. 1 & 2. stop cocks for in-
troducing and withdrawing water therefrom — P. plunger — t.t. projecting pins or tappets, at-
tached to its rod. L.R.R. paddle shafts or rods, and L. crank — i. the paddle gate answer-
ing the purpose of an induction valve — and E. the eduction paddle gate or valve. H. hand
gear consisting of the shaft and spanners. S.S. a vertical wheel. v. a horizontal wheel. h. and
a tumbler. y. — K. stop-gate for closing outlet — r. a plate of lead substituted for packing:
n. pivot for foot of paddle shaft — F F &c. timbers of the foundation and frame work.
In testimony that the preceding description is a true specification of the machine therein
claimed as my invention, and termed the regulated-pressure-engine, I have hereto
set my hand, this fifth day of July, in the year of our Lord, one thousand eight
hundred and thirty-four.

Witnesses
Will: Webb
John Larcombe

Daniel Livermore

Drawing
(Patented 24 July 1834)

4480 [illegible]

Exd
N.G.